United States Patent [19]

Smith

[11] 3,828,636

[45] Aug. 13, 1974

[54] ROTARY CUTTING APPARATUS

[75] Inventor: Richard W. Smith, Racine, Wis.

[73] Assignee: Pratt Manufacturing Corp., Milwaukee, Wis.

[22] Filed: Mar. 21, 1973

[21] Appl. No.: 343,582

[52] U.S. Cl............... 83/341, 83/345, 83/673
[51] Int. Cl............... B23d 25/12, B26d 1/12
[58] Field of Search............ 83/343, 345, 341, 342, 83/673, 674

[56] References Cited
UNITED STATES PATENTS

| | | | |
|---|---|---|---|
| 3,084,582 | 4/1963 | Anderson | 83/674 X |
| 3,431,830 | 3/1969 | Stovall | 83/343 X |
| 3,709,077 | 1/1973 | Trogan et al. | 83/674 X |

Primary Examiner—Willie G. Abercrombie
Attorney, Agent, or Firm—Arthur L. Morsell, Jr.

[57] ABSTRACT

Two elongated knives are synchronously rotated into and out of cutting engagement with each other about separate axes of rotation. A linearly-moving web of material is moved between the two knives and is positioned to be cut thereby when the knives meet in cutting engagement. The distance between the cutting edge of one knife and its axis of rotation is greater than the distance between the cutting edge of the other knife and its axis of rotation, whereby the cutting edges travel at different lineal speeds. The cutting edges are skewed with respect to one another so that the faster moving cutting edge wipes across the other cutting edge when they meet in cutting engagement. The cutting edges meet at a contact point which moves along the length of the two cutting edges as the faster moving cutting edge wipes across the slower. This produces a shear cutting action.

8 Claims, 8 Drawing Figures

PATENTED AUG 13 1974 3,828,636

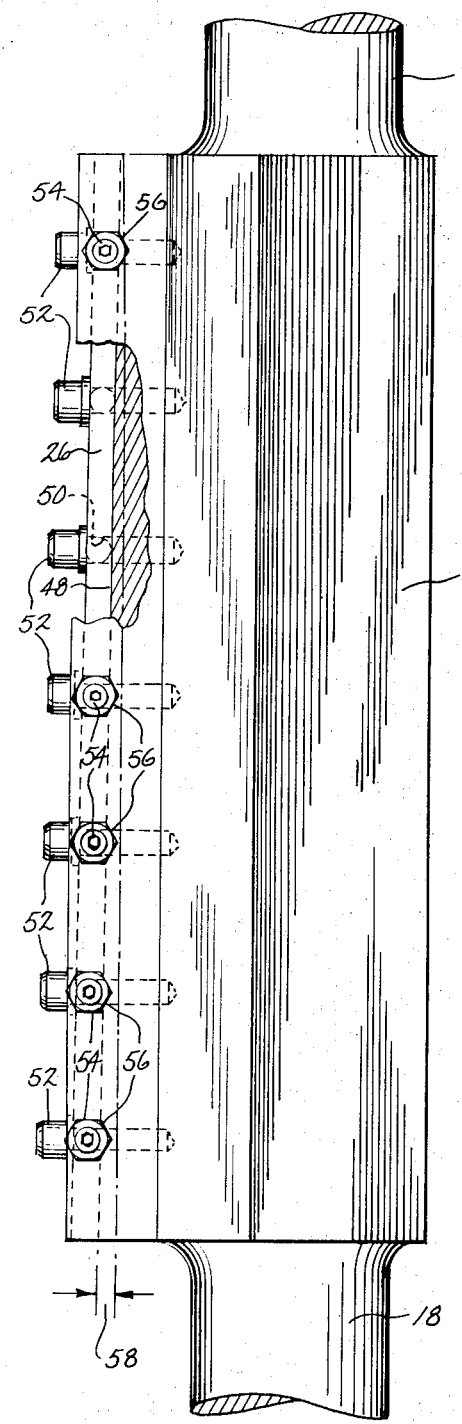
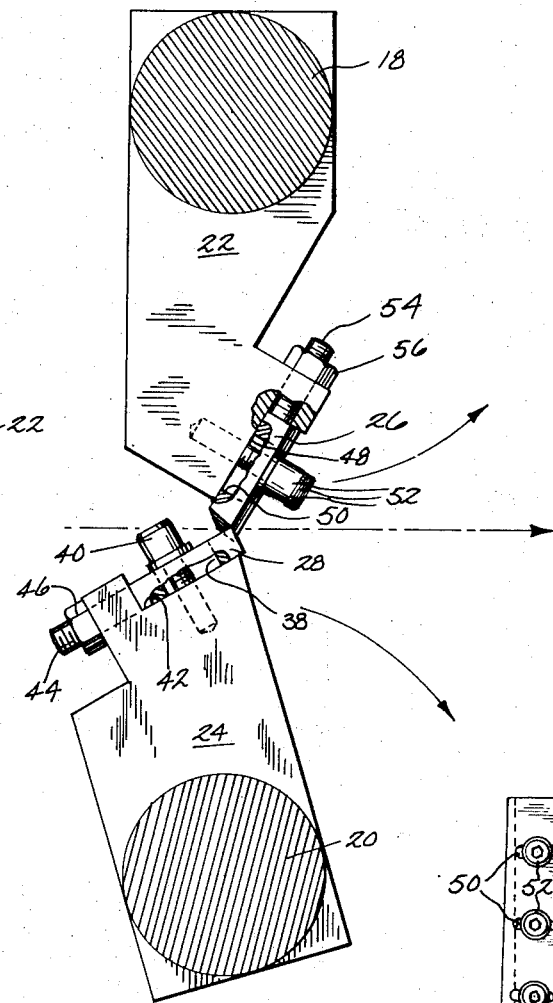
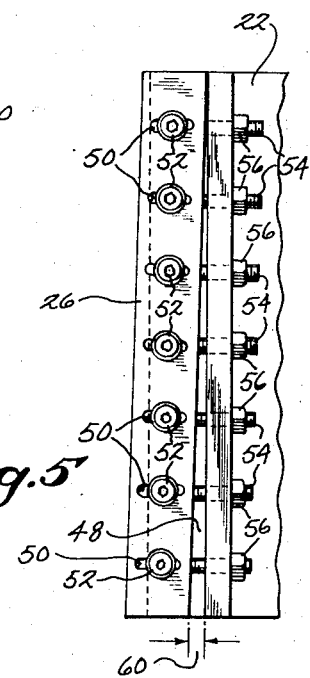

3,828,636

ROTARY CUTTING APPARATUS

BACKGROUND OF THE INVENTION

Rotary cutting apparatus is used in many different applications where a moving web of material is to be cut up into separate lengths. A typical application is in the packaging of surgical gloves in paper packages which are cut from a continuous web of paper material. In the past, the web of paper material has been cut into separate lengths by a "crush-cut" arrangement in which the paper was pinched between a rotary anvil knife and a rotary "crush-cut" knife. The two knives contacted each other along a straight line under considerable pressure so as to crush through the web of paper between them. This "crush-cut" arrangement had the drawback of producing a relatively large jolt each time the knives met, which produced undesired vibration, tended to throw the knives out of alignment, and caused undue wear on the cutting edge of the knives. Also, the vibration caused by the meeting of the knives sometimes moved the cut lengths of paper out of position, which caused defective operation of the remaining portions of the packaging machine. Moreover, the "crush-cut" gave a relatively irregular cut-off edge.

In view of the above, one object of this invention is to provide rotary cutting apparatus having lower cutting pressure, and therefore, having lower vibration and reduced wear on the cutting edges.

Another object of this invention is to provide rotary cutting apparatus that gives a more regular cut-off.

An additional object of this invention is to provide rotary cutting apparatus in which the cutting edges of the knives wipe across each other to produce a shear cutting action.

A further object of this invention is to provide rotary cutting apparatus in which the distance between the cutting edge of one knife and its axis of rotation is greater than the distance between the cutting edge of the other knife and its axis of rotation whereby the two cutting edges travel at different lineal speeds.

Another object of this invention is to provide rotary cutting apparatus of the above-noted character in which the cutting edges are skewed with respect to one another so that the faster moving cutting edge wipes across the slower moving cutting edge to produce a shear cutting action.

SUMMARY OF THE INVENTION

In accordance with this invention, the above-noted objects are attained by providing a pair of cutting elements which are synchronously rotated into and out of cutting engagement with each other about separate axes of rotation. A linearly-moving web of material is moved between the two cutting elements and is positioned to be cut thereby when the cutting elements meet in cutting engagement. The distance between the cutting edge of one cutting element and its axis of rotation is greater than the distance between the cutting edge of the other cutting element and its axis of rotation, whereby the cutting edges travel at different lineal speeds. The two cutting edges are skewed with respect to one another so that the faster moving cutting edge wipes across the slower moving cutting edge to produce a shear cutting action in the web of material moving between the two cutting elements. In the preferred embodiment of the invention, the axes of rotation of the two cutting elements are parallel, the cutting edge of one cutting element is parallel with its axis of rotation, and the cutting edge of the other cutting element is skewed to produce a shear cutting action.

DESCRIPTION OF THE DRAWINGS

FIG. 3 is a top view of the cutting element taken on the line 3—3 of FIG. 2 and showing the means for mounting the cutting knife and for adjusting the angle of the same;

FIG. 4 is a fragmentary cross-sectional view taken on the line 4—4 of FIG. 1 and showing the cutting edge of the two knives meeting;

FIG. 5 is a fragmentary view of the knife 26 in its holder looking from the left of FIG. 3;

DESCRIPTION OF THE PREFERRED EMBODIMENT

Figure 2:
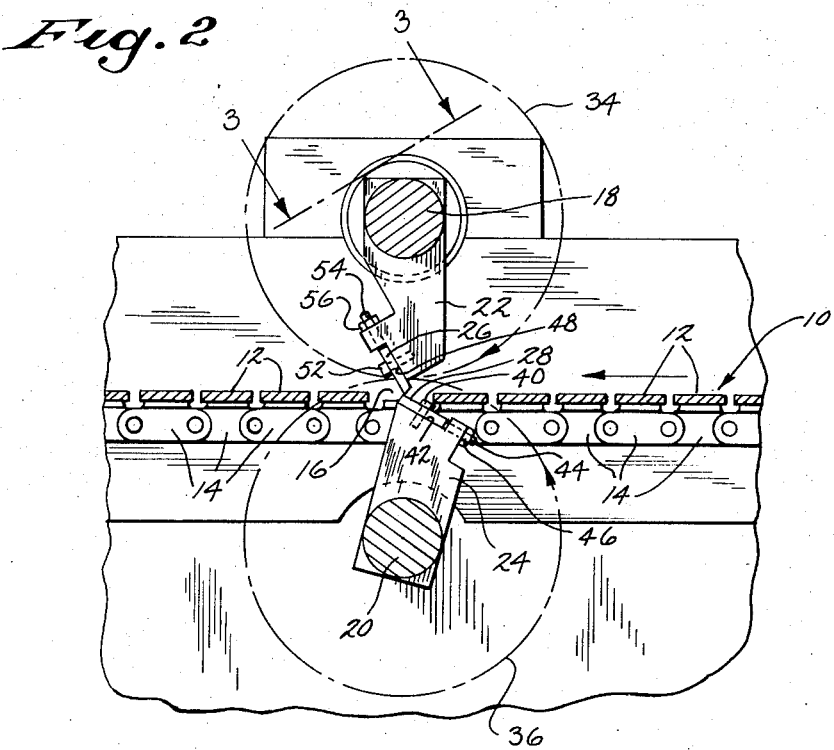
FIG. 2 is a cross-sectional view of the embodiment shown in FIG. 1.
Figure 1:
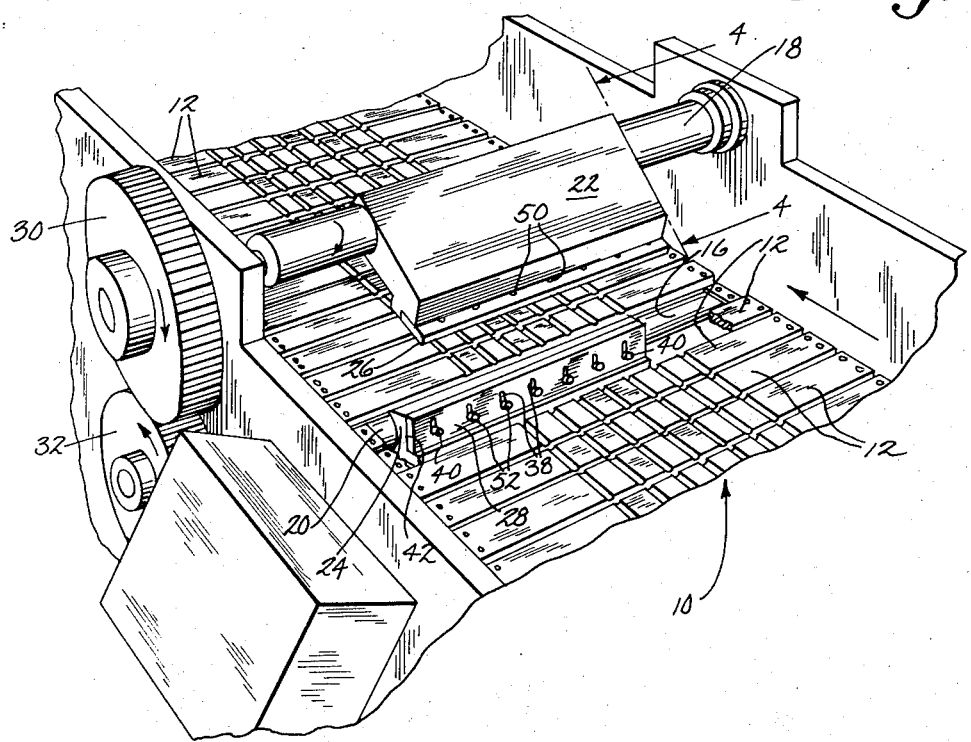
FIG. 1 is a fragmentary perspective view of one illustrative embodiment of this invention.

Referring to FIGS. 1 and 2, one illustrative embodiment of this invention is designed for use in combination with an automatic surgical glove-wrapping machine and includes an endless conveyor 10 comprising a plurality of individual flights 12 which are flexibly linked together by links 14. The conveyor 10 runs through the length of the automatic packaging machine but only the portion in the immediate vicinity of the rotary cutting apparatus is of interest in connection with this application and, therefore, only that portion is disclosed in the drawings. The conveyor 10 moves in FIG. 1 from the bottom of the view to the top of the view, and in FIG. 2, the conveyor 10 moves from the right to the left hand side of the drawing. A continuous web of paper material to be cut is carried on top of the flights 12 of conveyor 10 and individual flights 12 are removed at intervals along the conveyor 10 to provide longitudinally spaced access spaces through which cutting knives may enter to cut the web material. The access spaces are distributed along the conveyor 10 at regular intervals and coincide with the locations at which the material is to be cut. One such open space is shown in FIGS. 1 and 2 and is indicated by the reference numeral 16.

The rotary cutting apparatus is synchronized with the movement of the conveyor 10 so that the cutting knives of the rotary cutting apparatus come together in the open spaces 16 as shown in FIG. 2. In this particular embodiment of the invention, the rotary cutting apparatus includes an upper shaft 18 and a lower shaft 20 which are journalled for rotation about spaced parallel axes by means not shown in the drawings. An elongated cutting arm 22 is rigidly attached to shaft 18 and an elongated cutting arm 24 is rigidly attached to the shaft 20. A pair of rectangular cutting knives 26 and 28 are attached along the outer ends of respective arms 22 and 24 by means which are described hereinafter, and the knives are positioned to move into cutting engagement with each other once during each revolution of the two cutting arms 22 and 24. The shafts 18 and 20 and their respective cutting arms 22 and 24 are rotated in synchronism with each other at the same radial speed by means of two intermeshing gears 30 and 32 (see FIG. 1) whose pitch lines are indicated in FIG. 1 by the tangential circles 34 and 36. The gears 30 and 32 are driven in synchronism with the movement of the conveyor 10 by means which are not shown in the drawings but which will be apparent to those skilled in the art. The drive means for the gears 30 and 32 are synchronized so that the cutting edges of the two knives 26 and 28 will come together in cutting engagement within each of the open spaces 16 in the conveyor 10. This may be accomplished by any suitable prior art synchronizing means to give a 1:1 ratio to the knives so that they always meet at the same point.

In accordance with this invention, the distance between the cutting edge of one of the cutting knives 26 and 28 and its axis of rotation is greater than the distance between the cutting edge of the other cutting knife and its axis of rotation so that when the two cutting edges meet, one of them will be traveling faster than the other. The cutting edges are oriented at skewed angles to each other so that the faster moving cutting edge wipes across the slower moving cutting edge to produce a shear cut. Referring to FIG. 2, the two tangential pitch circles 34 and 36 are of equal radius. The cutting edges of the two knives 26 and 28 meet within the periphery of the lowermost pitch circle 36 and outside of the periphery of the uppermost pitch circle 34. This indicates that the distance between the cutting edge of the knife 26 and the axis of its shaft 18 is greater than the distance between the cutting edge of the knife 28 and the axis of its shaft 20. Therefore, the cutting edge of the knife 26 travels faster than the cutting edge of the knife 28 in terms of lineal speed although the two knives rotate at the same rotational speed. In the apparatus illustrated the upper knife is running at the surface speed of the conveyor 10. Before describing the angles at which the cutting edges of the two knives 26 and 28 are set with respect to each other and with respect to their axis of rotation, the means for mounting the two knives 26 and 28 will first be described.

As best shown in FIG. 1, the lower knife 28 is rectangular in shape and has a plurality of slots 38 formed therein for receiving screws 40 which hold the knife 28 in place against the rotating arm 24. As shown in the lowermost part of FIG. 4, the knife 28 fits within a recess 42 in the end of arm 24. The bottom face of the recess 42 is drilled and tapped at a plurality of locations therealong to receive the machine screws 40 which hold the knife 28 in place. A plurality of set screws 44 extend through arm 24 adjacent to the side of recess 42 and bear against the side edge of the knife 28 for the purpose of adjusting its position. Each of the set screws 44 is locked into place by means of a nut 46. The bottom of the recess 42 is tilted somewhat with respect to the radial faces of the arm 24 so that the trailing edge of the knife 28 is tilted as shown in FIG. 4. In this embodiment of the invention, the faces of the recess 42 are so positioned and arranged that the cutting edge of the knife 28 is parallel to the axis of the shaft 20 about which the knife 28 rotates.

It is an important feature of this invention that the two cutting edges be skewed with respect to each other, but it is immaterial whether the upper cutting edge be skewed with respect to the lower, or whether the lower cutting edge be skewed with respect to the upper. In this particular embodiment of the invention, the cutting edge of the knife 28 is held parallel to the axis of its shaft 20, and the cutting edge of the upper knife 26 is skewed by a predetermined amount relative to the axis of its rotating shaft to provide the necesary skewed relationship between the two knives.

Figure 6:
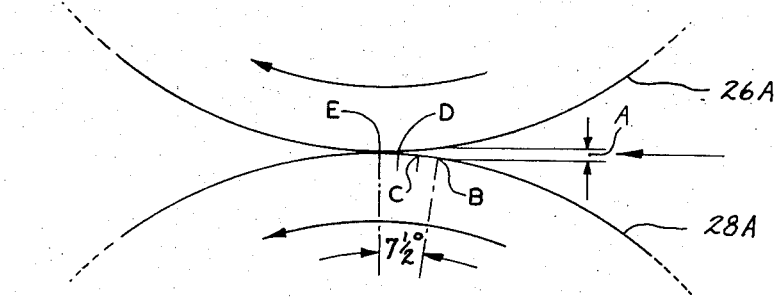
FIG. 6 is a diagrammatic representation of the paths followed by the cutting edges of the two knives in the region where the cutting edges make contact.

The upper knife 26 is shown in end view in FIG. 4, in plan view in FIG. 5, and part of it in edge view in FIG. 3. It should be noted that the scale of FIG. 3 is enlarged with respect to the scale of FIGS. 4 and 5. Referring to FIG. 4, the arm 22 is recessed at 48 to receive the knife 26. As shown in FIG. 5, the knife 25 has a plurality of slots 50 formed therein for receiving a plurality of machine screws 52 which hold the knife 26 in position against the face of the recess 48. The recess 48 is drilled and tapped on one side to receive the machine screws 52 and is drilled and tapped on the other side to receive a plurality of set screws 54, each having a lock nut 56 thereon. As best shown in FIG. 3, the bottom face of the recess 48 is angled with respect to the axis of the shaft 18 to provide the minor angle 58. Thus the cutting edge of knife 26 is angled with respect to a line parallel to the axis of the shaft 18. The angle 58 is relatively small. In this particular embodiment of the invention, the knife 26 is 11 inches long and the angle is such that the distance 58 in FIG. 3 is 7/64ths of an inch. It should be understood, however, that the invention is not limited to the specific angle mentioned above since larger or smaller angles can be used depending upon the type and thickness of material that is to be cut and other factors which are well known to those skilled in the art. In addition to being maintained in tilted position by the angle 58, the cutting edge of the knife 26 is also tilted in a plane at right angles to the tilt angle 58, the amount of which is under the control of the set screws 54. This second tilt angle is shown in FIG. 5 and is indicated by the reference numeral 60. The tilt angle 60 determines the point at which the cutting edges of the knives 26 and 28 make cutting contact with each other with respect to the arcs through which they travel. FIG. 6 is a fragmentary representation of the arcs through which the cutting edges of the two knives 26 and 28 travel, the arc for the cutting edge of knife 26 being indicated as arc 26A, and the arc for the cutting edge of knife 28 being indicated as arc 28A. The arcs 26A and 28A are traced by the points on the cutting edges of the two knives 26 and 28 which are furthest away from each other. The angle 60 shown in FIG. 5 is adjusted as indicated in FIG. 6 at A so that the leading end of the cutting edge of knife 26 will initially engage the cutting edge of the knife 28 at a point B which is 7½° in advance of center position E for the two cutting edges. In practice, the requisite angle 60 is obtained by manually rotating the arms 22 and 24 until they are in a position where they are 7½° before center position E and then adjusting the set screws 54 until the leading end of the cutting edges of the two knives 26 and 28 make initial contact with each other at the end of their span. It should be noted here that a larger or smaller angle than 7½° might be used for the cutting stroke, depending upon the type of material used and the circumstances involved, as will be apparent to those skilled in the art. The value of 7½° is given by way of example and is not to be taken as a limitation on the invention.

Figure 7:
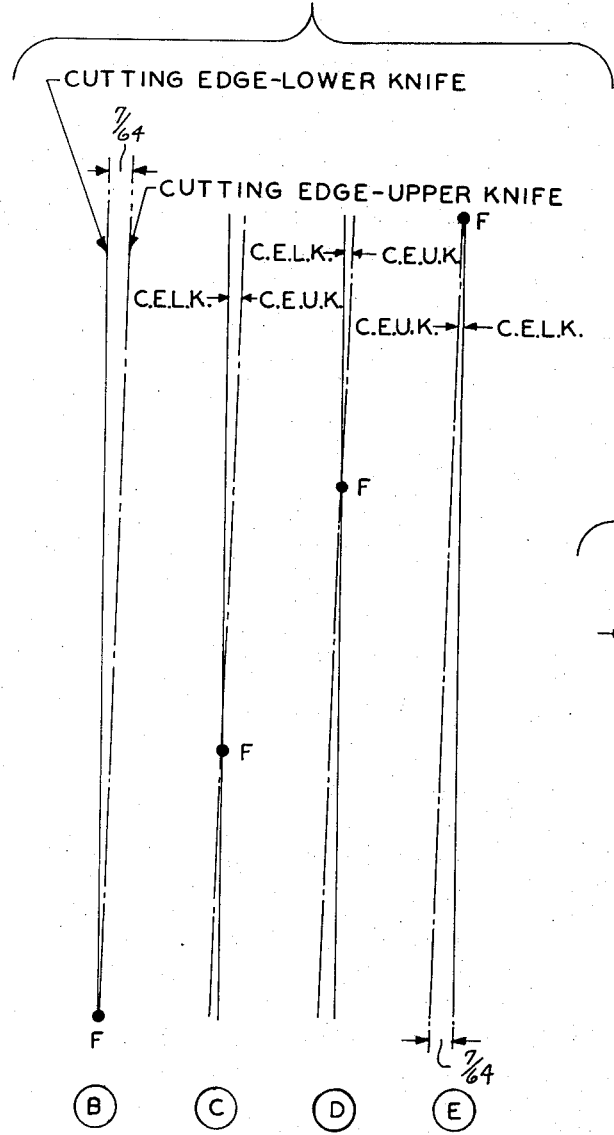
FIG. 7 is a sequence of views looking generally down, referring to FIG. 6, showing the contact between the two cutting edges at different positions in FIG. 6.
Figure 8:
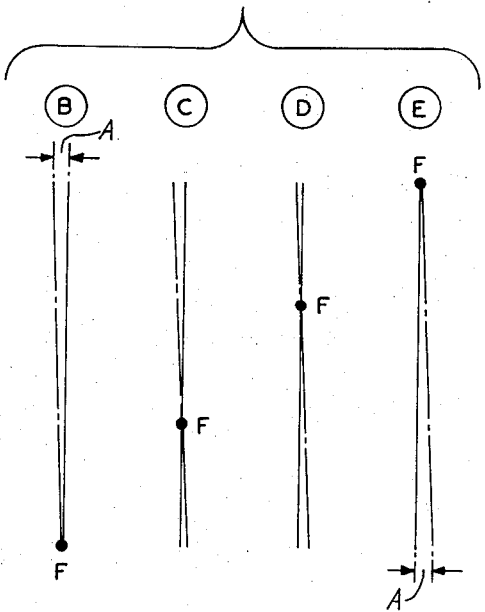
FIG. 8 is a sequence of views, looking at right angles to FIG. 6, showing the contact between the two cutting edges at different positions in FIG. 6.

FIGS. 6, 7 and 8 are diagrammatic representations showing the relative positions of the cutting edge provided by knife 26 and the cutting edge provided by bottom knife 28 as the knives move past one another in cutting engagement. Before going into a detailed description of these figures, however, it should be noted that in general terms the cutting action allows a complete wiping of the faster moving cutting edge across the slower moving cutting edge within the 7½° arc of travel illustrated in FIG. 6 during which period the cutting edges are in engagement with each other. To produce this wiping action, it is essential that one cutting edge be traveling at a higher lineal speed than the other. In addition, it is also necessary to have the two cutting edges meet at the proper angle so that they will produce a true shear cut movement in conjunction with one another. The requisite angles which are necessary to produce this action have been described above.

The points marked B, C, D, and E on FIG. 6 represent four successive positions of the cutting edges of the two knives 26 and 28 as they pass each other in cutting engagement during the 7½° arc of rotation in which they engage each other. The lines labeled B, C, D, and E in FIGS. 7 and 8 represent the relative positions of the two cutting edges as they pass in sequence from point B to point C to point D to center point E. FIG. 7 is a view looking down, it being understood that the line of FIG. 7 extends axially of the shafts 18 and 20. FIG. 8 is a view looking at right angles to the view of FIG. 7 or from the left, referring to FIG. 6. Referring to step B of FIGS. 7 and 8 and to position B of FIG. 6, the two cutting edges meet at point F which is located at the extreme end of both of the cutting edges. As the two cutting edges move progressively past the points B, C, D, and E in FIG. 6, their point of contact F progressively wipes across the length of the cutting edges as shown in FIGS. 7 and 8, and the two cutting edges part company when they reach the center point E on FIG. 5. This produces a shear cutting action which only requires a very low pressure between the two cutting edges but which produces a good clean cut with a minimum of wear on the two cutting edges. This eliminates all of the vibration problems of the prior art "crush-cut" arrangement and also provides a cleaner cut and longer wearing parts which reduces the down time required to keep the machine in operating condition.

This cutting apparatus is particularly useful in conjunction with machines for continuously packaging relatively flat items. In this type of machine, a continuously-moving web of material, supported on the conveyor 10, is folded from two sides over the flat items, of which surgical gloves is one example, and the edges of the web are continuously fin-sealed along a line extending longitudinally of the moving web. Also, there are transverse seals at the ends of the package and the cutters cut transversely of the web. With this type of machine the spaces 16 in the conveyor 10, as shown in FIG. 2, are spaced apart a distance equal to the length of the final package.

It is important with this type of wrapping machine that the cutters be capable of performing the cutting operation without requiring large gaps in the conveyor. If the conveyor gaps 16 were too large there would be insufficient support for the product, with the result that the product could fall through or sag into the conveyor gaps. With the present machine, a shear cut can be obtained while using a relatively short gap 16 in the conveyor as is shown in FIG. 2, and the cutting action is performed without the jolts produced by the "crush-cut" knives heretofore commonly employed in this type of apparatus. It is to be noted from FIG. 2 that the cutting edge of the upper knife 26 makes cutting engagement at substantially the upper surface of the conveyor 10 where it is moving at substantially the surface speed of the conveyor, the bottom knife running at a slower surface speed. The improved arrangement of the present invention not only provides the shear cut, but also makes it possible to obtain the shear cut with two knives running at different surface speeds, while maintaining a 1:1 ratio between the knives so that they always meet at the same point in perfectly-timed relationship with the gaps 16 in the conveyor. The arrangement of the present invention provides a very efficient shear cutting action which takes place rapidly in a relatively short space between flights in a conveyor.

Various changes and modifications may be made without departing from the spirit of the invention, and all of such changes are contemplated as may come within the scope of the claims.

What I claim is:

1. In a rotary cutting apparatus having two cutting elements which are rotated synchronously into and out of cutting engagement with each other about separate axes of rotation and having a lineally moveable product-supporting conveyor with longitudinally-spaced gaps supported for movement between the axes of rotation of said knives, the improvement wherein the cutting elements are so supported that the distance between the cutting edge of a first cutting element and its axis of rotation is greater than the distance between the cutting edge of the other cutting element and its axis of rotation, the cutting edges of said cutting elements being movable into cutting engagement within the gaps of the conveyor, with the engagement between the knives taking place substantially in the plane of the top surface of the conveyor, said cutting edges traveling at different lineal speeds with the cutting edge of said first cutting element traveling at the same lineal speed as the conveyor, and said cutting edges meeting in cutting engagement in a conveyor gap, once for every revolution of the cutting elements.

2. In a rotary cutting apparatus having two cutting elements which are rotated synchronously into and out of cutting engagement with each other about separate axes of rotation, the improvement wherein the cutting elements are so supported that the distance between the cutting edge of one cutting element and its axis of rotation is greater than the distance between the cutting edge of the other cutting element and its axis of rotation, whereby the cutting edges of the cutting elements travel at different lineal speeds, said cutting elements being so positioned relative to one another as to nonetheless meet in cutting engagement once for every revolution thereof, said cutting element whose cutting edge is at the greater distance from the axis of rotation being supported at an angle with respect to the edge of the other cutting element so that one end of said cutting edge of the first-mentioned cutting element leads as said cutting edge moves into cutting engagement, and said cutting edge which is at said first-mentioned angle being also angled in a direction away from the axis of rotation with said lead end at the greater distance from said axis of rotation.

3. The improvement defined in claim 2 in which said cutting elements are synchronously rotated by means of two intermeshed gears of equal radius whose pitch lines form tangential circles, said two cutting elements being positioned to make cutting contact with each other along a cutting line that lies within the circumference of the circle for the cutting element which is closer to its axis of rotation.

4. The improvement defined in claim 2 in which the cutting element whose cutting edge is at the greater distance from its axis of rotation is supported in a position which provides a crossing angle with respect to the edge of the other cutting element.

5. The improvement defined in claim 2 in which the cutting element whose cutting edge is at the lesser distance from its axis of rotation is straight in an axial direction, and in which the cutting edge of the other cutting element is supported at said two angles in different planes.

6. The improvement defined in claim 2 in which there is an elongated arm supporting the cutting element which is at the greater distance from its axis of rotation, said elongated arm having a face portion with a recess, said cutting element being removably supported in said recess, and the bottom face of said recess being angled to so support said cutting element when the latter is against said angled face that its cutting edge is at an angle whereby one end of said cutting edge leads as said cutting edge moves into cutting engagement with the cutting edge of the other cutting element.

7. The improvement defined in claim 6 in which there is means for adjustably varying the angle of the cutting edge of said angled knife in a plane at right angles to the plane of the bottom face of said recess so that the lead end of said cutting edge is also at a greater distance from the axis of rotation than the opposite end.

8. The improvement defined in claim 2 in which the lead end of the cutting edge of the cutting element which is at the greater distance from the axis of rotation meets the cutting edge of the other cutting element in advance of center position and continues in shearing engagement with said other cutting edge until said center position is reached.

* * * * *